United States Patent
Nandan et al.

(10) Patent No.: US 12,401,679 B1
(45) Date of Patent: Aug. 26, 2025

(54) AI MODEL BASED CYBERSECURITY DETECTION PRIORITIZATION FOR CYBERSECURITY MANAGEMENT SYSTEMS

(71) Applicant: CrowdStrike, Inc., Sunnyvale, CA (US)

(72) Inventors: Manu Nandan, Frisco, TX (US); Michael Brautbar, Wayland, MA (US)

(73) Assignee: CrowdStrike, Inc., Sunnyvale, CA (US)

(*) Notice: Subject to any disclaimer, the term of this patent is extended or adjusted under 35 U.S.C. 154(b) by 0 days.

(21) Appl. No.: 18/929,233

(22) Filed: Oct. 28, 2024

(51) Int. Cl.
*H04L 9/40* (2022.01)
*H04L 41/16* (2022.01)

(52) U.S. Cl.
CPC .......... *H04L 63/1433* (2013.01); *H04L 63/20* (2013.01); *H04L 41/16* (2013.01)

(58) Field of Classification Search
CPC ...... H04L 63/1433; H04L 63/20; H04L 41/16
USPC ........................................................ 726/22
See application file for complete search history.

(56) References Cited

U.S. PATENT DOCUMENTS

| | | | |
|---|---|---|---|
| 11,336,669 B2 | 5/2022 | Bazalgette et al. | |
| 2019/0141061 A1* | 5/2019 | Krishtal | H04L 63/101 |
| 2023/0018808 A1 | 1/2023 | Silberman et al. | |
| 2023/0291755 A1* | 9/2023 | Siebel | H04L 63/1416 |

FOREIGN PATENT DOCUMENTS

CA 3018368 A1 9/2017

* cited by examiner

*Primary Examiner* — Anthony D Brown
(74) *Attorney, Agent, or Firm* — Womble Bond Dickinson (US) LLP (57) ABSTRACT

The present disclosure provides an approach of collecting historical cybersecurity detection data comprising a plurality of cybersecurity detections and a plurality of detection times. The approach transforms the historical cybersecurity detection data into a plurality of rank ordered detection datasets that rank order each one of the plurality of cybersecurity detections based on the plurality of detection times. In turn, the approach trains an artificial intelligence (AI) model using the plurality of rank ordered detection datasets to generate a prioritized output dataset from an input dataset.

20 Claims, 6 Drawing Sheets

AI MODEL BASED CYBERSECURITY DETECTION PRIORITIZATION FOR CYBERSECURITY MANAGEMENT SYSTEMS

TECHNICAL FIELD

Aspects of the present disclosure relate to cybersecurity, and more particularly, to an Artificial Intelligence (AI) model based approach to prioritize cybersecurity detections for cybersecurity management systems.

BACKGROUND

Cybersecurity refers to the practice of protecting computer systems, networks, and digital assets from theft, damage, unauthorized access, and various forms of cyber threats. Cybersecurity threats encompass a wide range of activities and actions that pose risks to the confidentiality, integrity, and availability of computer systems and data. These threats can include malicious activities such as viruses, ransomware, and hacking attempts aimed at exploiting vulnerabilities in software or hardware. Additionally, cybersecurity threats also encompass suspicious activities, such as unusual patterns of network traffic or unauthorized access attempts, which may indicate potential security breaches or weaknesses that need investigation and mitigation.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Cybersecurity management systems, such as a Security Information and Event Management (SIEM) system, are advanced cybersecurity systems designed to provide comprehensive real-time monitoring, detection, and analysis of cybersecurity events within an organization's IT infrastructure. By aggregating and correlating data from diverse sources such as network devices, servers, applications, and other security systems, cybersecurity management systems provide to analysts the ability to identify and respond to potential cybersecurity threats.

Existing cybersecurity management systems rely on manual cybersecurity detection prioritization using heuristics. Analysts typically check for cybersecurity detections of particular types or search for cybersecurity detections on critical assets, such as domain controllers, within the cybersecurity management system software. This process involves analysts reviewing a list of unresolved cybersecurity detections, conducting shallow investigations, and deciding which cybersecurity detections warrant deeper investigation and which cybersecurity detections can be ignored. The manual approach requires considerable time and effort from the analysts and is prone to errors due to its inherent human involvement. In addition, the manual approach not only delays the identification of critical cybersecurity incidents but also increases the risk of missing important cybersecurity detections.

The cybersecurity management systems continuously collect numerous cybersecurity detections, often from third-party sources. These cybersecurity detections may not always pertain to the same issue or may represent different variations of the same event, which makes it even more challenging for an analyst to quickly review all the cybersecurity detections. When faced with potentially hundreds of incoming cybersecurity detections, analysts must sift through them efficiently. For instance, if out of several hundred alerts, five cybersecurity detections may indicate an ongoing attack and must be identified and addressed as quickly as possible, ideally within minutes.

In addition, different vendors may prioritize cybersecurity detections using different criteria that are derived from individual vendor rules that are intended to be broadly applicable across all their destination systems. For example, Vendor A provides scores for their cybersecurity detections, categorized as high, medium, or low, and Vendor B uses a similar classification system. However, the comparison between Vendor A's high-priority cybersecurity detections and Vendor B's high-priority cybersecurity detections is often unclear. For instance, a medium-priority cybersecurity detection from Vendor A might actually be of higher importance than a high-priority cybersecurity detection from Vendor B. Existing cybersecurity management systems do not account for this discrepancy.

Furthermore, rule-based approaches to shortlisting cybersecurity detections present their own set of challenges. Static rules may fail to account for evolving attack vectors, resulting in missed cybersecurity detections of new or sophisticated threats. For example, an emerging attack may involve cybersecurity detections that were previously considered low priority and thus ignored. Updating these static rules to adapt to new threats requires continuous effort and vigilance from analysts, consuming valuable time and resources. Consequently, maintaining the effectiveness of cybersecurity management systems through manual rule updates is both resource-intensive and inefficient.

Artificial intelligence (AI) is a field of computer science that encompasses the development of systems capable of performing tasks that typically require human intelligence. Machine learning is a branch of artificial intelligence focused on developing algorithms and models that allow computers to learn from data and make predictions or decisions without being explicitly programmed. Machine learning models are the foundational building blocks of machine learning, representing the mathematical and computational frameworks used to extract patterns and insights from data. Large language models, a specialized category within machine learning models, are trained on vast amounts of text data to capture the nuances of language and context. By combining advanced machine learning techniques with enormous datasets, large language models harness data-driven approaches to achieve highly sophisticated language understanding and generation capabilities. As discussed herein, artificial intelligence models, or AI models, include machine learning models, large language models, and other types of models that are based on neural networks, genetic algorithms, expert systems, Bayesian networks, reinforcement learning, decision trees, or combination thereof.

The present disclosure addresses the above-noted and other deficiencies by transforming historical cybersecurity detection data into rank ordered detection datasets and using the rank ordered detection datasets to train an artificial intelligence (AI) model. The present disclosure then uses the trained AI model to prioritize detections at a destination system. In one embodiment, the processing device collects cybersecurity detection data including cybersecurity detections with "detection times," also referred to herein as "detection start times," that are associated with times at which the cybersecurity detections are detected. The cybersecurity detection data may also include resolved detection times corresponding to times at which cybersecurity detections are resolved. In one embodiment, the processing device normalizes the cybersecurity detection data by mapping detection fields from a first cybersecurity detection corresponding to a first destination to detection fields from a second cybersecurity detection corresponding to a second destination to produce normalized cybersecurity detection data.

In one embodiment, the cybersecurity detection data corresponds to a collection timeframe, which the processing device segments into time intervals. For each one of the time intervals, the processing device identifies a portion of the cybersecurity detections that are resolved within the time interval or unresolved at an end time of the time interval. In one embodiment, the processing device computes a duration time of the resolved cybersecurity detections utilizing their corresponding detection start times and their corresponding resolved detection times. The processing device computes a duration time of the unresolved cybersecurity detections utilizing their corresponding detection start time and the end time of the time interval.

The processing device transforms the cybersecurity detection data into rank ordered detection datasets that rank order each one of the cybersecurity detections based on their corresponding detection start time. In one embodiment, the processing device also uses the resolved detection times of the resolved cybersecurity detections in the rank ordering. In one embodiment, the processing device prioritizes the resolved cybersecurity detections in front of the unresolved cybersecurity detections.

In turn, the processing device trains an artificial intelligence (AI) model using the rank ordered detection datasets to generate a prioritized output dataset from an input dataset.

In one embodiment, the processing device sends the trained AI model to a destination system, and the AI model produces a prioritized cybersecurity detection list that includes unresolved cybersecurity detections at the destination system.

Figure 1:
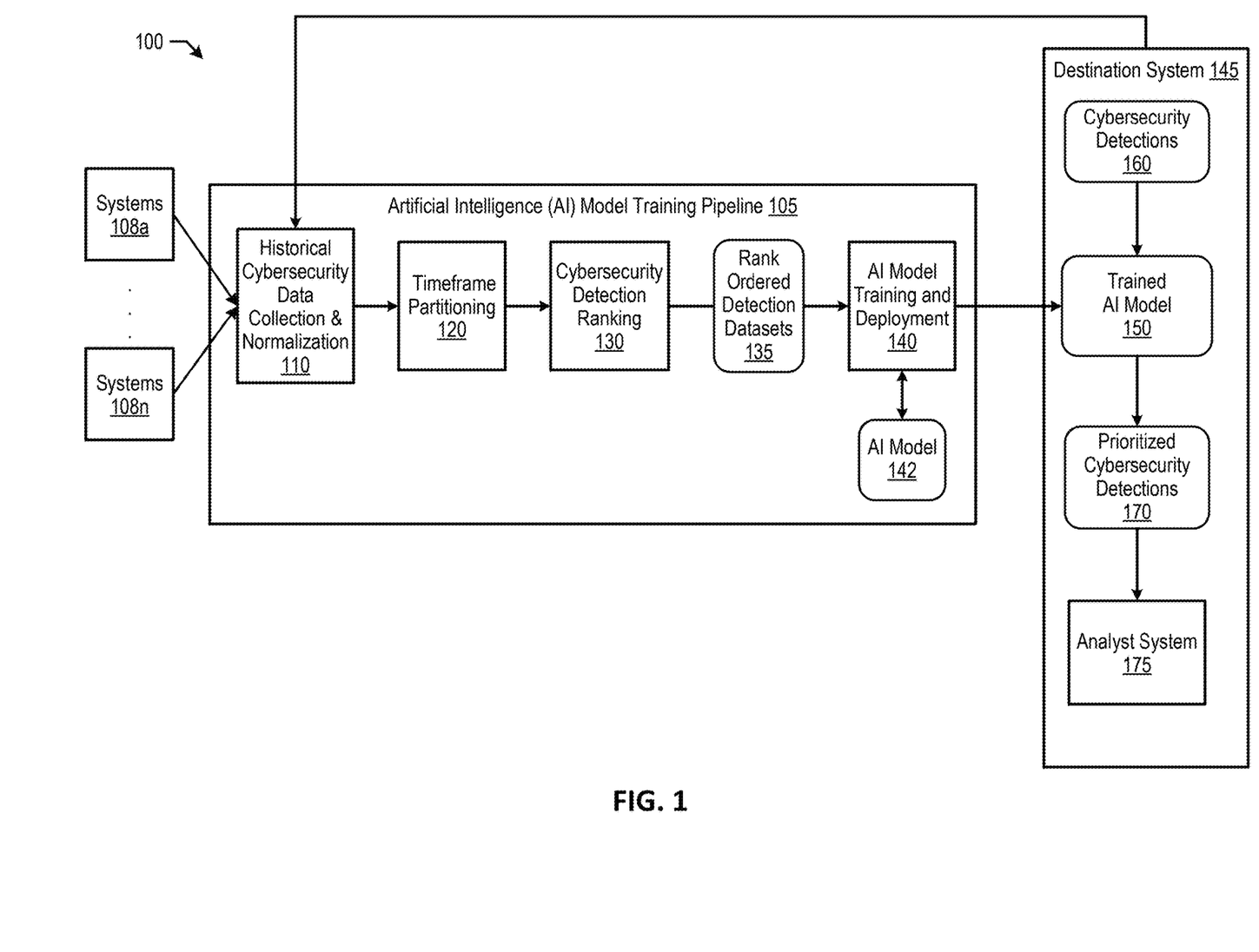
FIG. 1 is a block diagram that illustrates an example system that uses historical cybersecurity detection data to train an AI model and use the trained AI model at a destination system to rank order current cybersecurity detections, in accordance with some embodiments of the present disclosure.

FIG. 1 is a block diagram that illustrates an example system that uses historical cybersecurity detection data to train an AI model and use the trained AI model at a destination system to rank order current cybersecurity detections, in accordance with some embodiments of the present disclosure.

System 100 includes AI model training pipeline 105, which includes historical cybersecurity data collection and normalization 110. Historical cybersecurity data collection and normalization 110 collects historical cybersecurity detection information about the urgency at which previous cybersecurity detections have been processed. For example, an analyst corresponding to destination system 145 may have received a cybersecurity detection and resolved the cybersecurity detection, ignored the cybersecurity detection, or reassigned the cybersecurity detection to another analyst. In one embodiment, the amount of historical cybersecurity detection information from destination system 145 may not be sufficient for AI model training. As such, historical cybersecurity data collection and normalization 110 collects historical cybersecurity detection data from other systems 108, such as those from a similar industry. For example, destination system 145 may correspond to a small bank that does not produce sufficient cybersecurity detection data, and historical cybersecurity data collection and normalization 110 obtains cybersecurity detection data from larger bank systems 108. In one embodiment, AI model training pipeline 105 assigns higher weighting to historical cybersecurity data from destination system 145.

Historical cybersecurity data collection and normalization 110 performs feature engineering to convert the historical cybersecurity detection data into a normalized format applicable to multiple types of cybersecurity detections by capturing relevant information across various cybersecurity detection types. For instance, each cybersecurity detection type may include fields such as vendor name, detection type, and risk score. These fields are standardized to ensure consistency, such as mapping 'source IP' and 'source address' to 'IP address'. Feature extraction converts the cybersecurity detections from various security vendors into a normalized set of features and may include time-based features, such as the number of similar detections in the past day or week at the organization.

Timeframe partitioning 120 partitions a collection timeframe of the historical cybersecurity detection data into time intervals. For example, the collection timeframe of the historical cybersecurity detection data may be from 6 am-7 am (one hour), and the hour is partitioned into 5 minute time intervals. Next, cybersecurity detection ranking 130 transforms the cybersecurity detection data into rank ordered detection datasets 135 that rank order each one of the cybersecurity detections on a per time interval basis (see FIGS. 2, 3, and corresponding text for further details). Rank ordered detection datasets 135 rank orders corresponding historical cybersecurity detections based on their corresponding detection start time and whether they have been resolved within a given time interval.

In one embodiment, resolved cybersecurity detections are ranked higher than unresolved cybersecurity detections. In one embodiment, unresolved cybersecurity detections may be ranked higher that resolved cybersecurity detections if the time taken to resolve the cybersecurity detection is more than double that of the time since the start of an unresolved cybersecurity detection. In one embodiment, cybersecurity detections marked as "ignore" are ranked lower than each of the unresolved cybersecurity detections.

AI model training and deployment 140 then trains AI model 142 using rank ordered detection datasets 135. In one embodiment, during AI model training, for an input {di}, AI model 142 outputs {di, si}, where si is the relevance score indicating the rank of a detection. Given a set of ranked detections {di, ri}, AI model 142 learns the preference between pairs of detections L (dm, dn) from {di}, where L (dm, dn)=1 if rm is better than rn and 0 otherwise. By summing L( ) over all pairs of {di} in the given set, the ranking problem is converted into a form similar to binary classification. As such, AI model 142 is trained to predict relevance scores by computing this loss over all sets of ranked detections in the training set. In turn, AI model training and deployment 140 deploys trained AI model 150 to destination system 145.

Destination system 145 uses trained AI model 150 to receive current cybersecurity detections 160. Trained AI model 150 prioritizes cybersecurity detections 160 based on its training and produces prioritized cybersecurity detections 170, which is rank ordered prioritization of cybersecurity detections 160. In turn, prioritized cybersecurity detections 170 are provided to analyst system 175 such that analyst system 175 (or an analyst) can focus attention on the higher prioritized cybersecurity detections.

Figure 2:
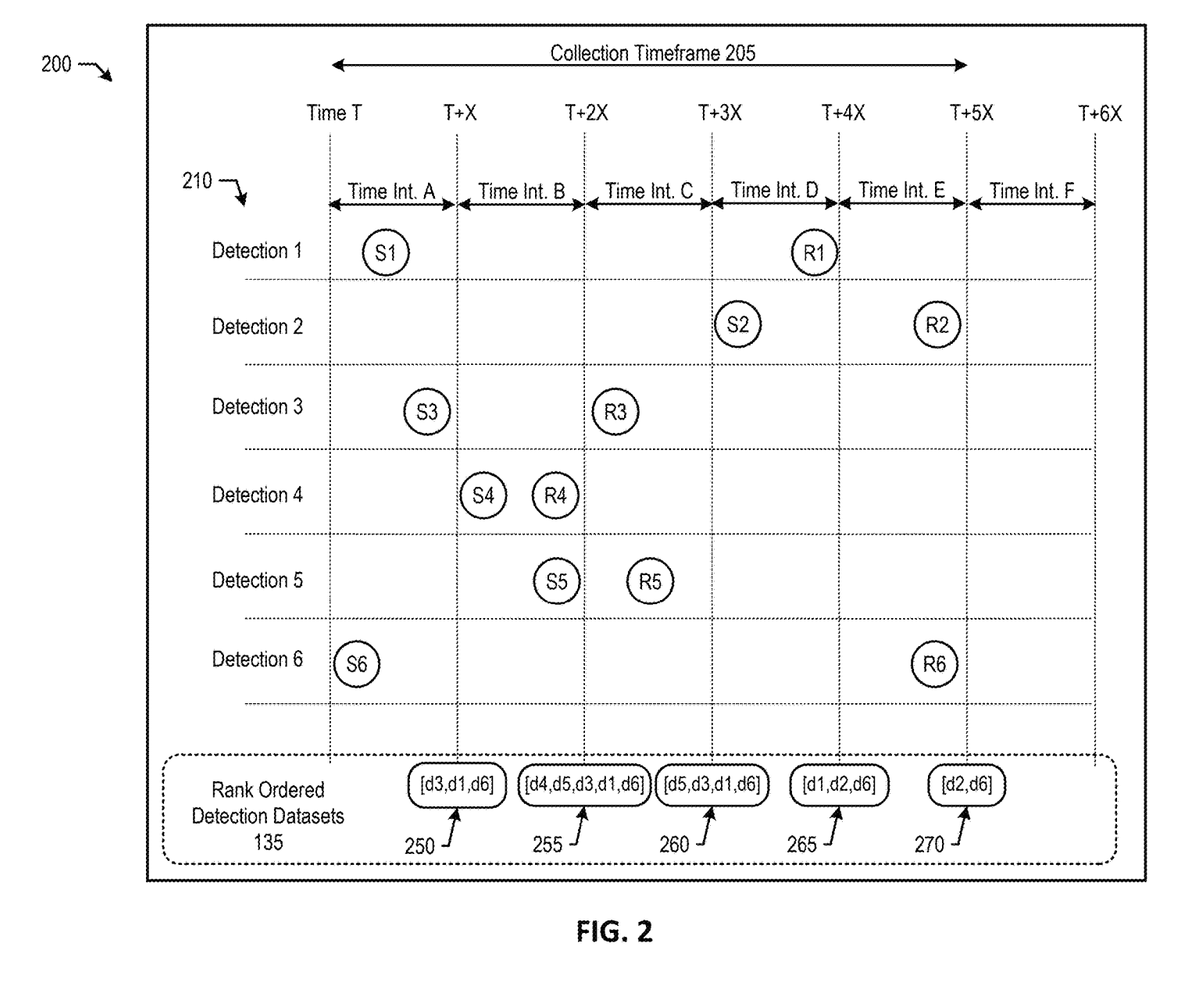
FIG. 2 is a block diagram that illustrates an example diagram for partitioning a cybersecurity detection data collection timeframe into time intervals and producing rank ordered detection datasets for the time intervals, in accordance with some embodiments of the present disclosure.

FIG. 2 is a block diagram that illustrates an example diagram for partitioning a cybersecurity detection data collection timeframe into time intervals and producing rank ordered detection datasets for the time intervals, in accordance with some embodiments of the present disclosure.

Diagram 200 shows cybersecurity detection data for detections 210 over a collection timeframe 205 (e.g., one hour). Collection timeframe 205 is partitioned into time intervals according to a time "X." For example, if X is 10 minutes, time interval A is from time 0-10 minutes; time interval B is from time 10-20 minutes; time interval C is from time 20-30 minutes; time interval D is from time 30-40 minutes; time interval E is from time 40-50 minutes; and time interval F is from time 50-60 minutes.

Diagram 200 shows detection start times "Sd" and resolved detection times "Rd" for each cybersecurity detection d (d is the detection identifier). For cybersecurity detection 1, the detection start time is in time interval A and the resolved detection time is in time interval D. For cybersecurity detection 2, the detection start time is in time interval D and the resolved detection time is in time interval E. For cybersecurity detection 3, the detection start time is in time interval A and the resolved detection time is in time interval C. For cybersecurity detection 4, the detection start time is in time interval B and the resolved detection time is in time interval B (indicating a quick resolution). For cybersecurity detection 5, the detection start time is in time interval B and the resolved detection time is in time interval C. For cybersecurity detection 6, the detection start time is in time interval A and the resolved detection time is in time interval E.

At the end of each time interval (or the beginning of the next time interval), cybersecurity detection ranking 130 analyzes cybersecurity detection data corresponding to a) unresolved cybersecurity detections and b) cybersecurity detections that have been resolved during the time interval. At the end of time interval A, cybersecurity detections 1, 3, and 6 are unresolved cybersecurity detections and there are no cybersecurity detections that were resolved during time interval A. Cybersecurity detection ranking 130 then analyzes the duration time of cybersecurity detections 1, 3, and 6 to determine ranking. The duration time of an unresolved cybersecurity detection is the amount of time between the detection start time and the end time of the particular time interval. Cybersecurity detections that have been unresolved the longest amount of time receive a lower ranking. For example, for time interval A, the duration time of cybersecurity detection 1 is the amount of time between "S1" and "T+X." Likewise, for time interval A, the duration time of cybersecurity detection 3 is the amount of time between "S3" and "T+X," and the duration time of cybersecurity detection 6 is the amount of time between "S6" and "T+X." Because S3 is the most recent occurrence and S6 is the least recent occurrence, the duration time of detection 3 is the shortest and the duration time of detection 6 is the longest. As such, in order of shortest duration time to longest duration time, the detections are rank ordered [d3, d1, d6] (rank ordered detection dataset 250).

Moving to time interval B, at the end of time interval B, cybersecurity detections 1, 3, 6, and 5 are unresolved cybersecurity detections, and cybersecurity detection 4 starts and is resolved during time interval B. Because cybersecurity detection 4 is resolved, cybersecurity detection 4 is ranked ordered first. Then, the remaining unresolved cybersecurity detections are rank ordered according to their duration time as discussed above. The duration time of cybersecurity detection 5 is the shortest because detection 5 is the most recent cybersecurity detection relative to time T+2X. As such, the cybersecurity detections are rank ordered [d4, d5, d3, d1, d6] (rank ordered detection dataset 255).

Moving to time interval C, at the end of time interval C, cybersecurity detections 1 and 6 are unresolved cybersecurity detections, and cybersecurity detections 3 and 5 are resolved within time interval C. Because cybersecurity detection 4 is resolved, cybersecurity detection 4 is ranked ordered first. Then, the remaining unresolved cybersecurity detections are rank ordered according to their duration time as discussed above. The duration time of cybersecurity detection 5 is the shortest because cybersecurity detection 5 is the most recent detection relative to time T+3X. As such, the cybersecurity detections are rank ordered [d4, d5, d3, d1, d6] (rank ordered detection dataset 260).

Moving to time interval D, at the end of time interval D, cybersecurity detections 2 and 6 are unresolved cybersecurity detections, and cybersecurity detection 1 is resolved within time interval D. Because cybersecurity detection 1 is resolved, cybersecurity detection 1 is ranked ordered first. Then, the remaining unresolved cybersecurity detections are rank ordered according to their duration time as discussed above. The duration time of cybersecurity detection 2 is the shortest because cybersecurity detection 2 is the most recent detection relative to time T+4X. As such, the cybersecurity detections are rank ordered [d1, d2, d6] (rank ordered detection dataset 265).

Moving to time interval E, at the end of time interval E, cybersecurity detections 2 and 6 are resolved within time interval E and no unresolved cybersecurity detections remain. The duration time of cybersecurity detection 2 (R2-S2) is shorter than the duration time of cybersecurity detection 6 (R6-S6). As such, the cybersecurity detections are rank ordered [d2, d6] (rank ordered detection dataset 270). Moving to time interval F, no unresolved cybersecurity detections are present and no detections are resolved during time interval F. As such, a rank ordered detection dataset may not be produced.

In one embodiment, the rank ordered detection datasets 135 are fed to AI model training and deployment 140 as they are produced. In one embodiment, the rank ordered detection datasets 135 are fed to AI model training and deployment 140 on a per collection timeframe basis.

Figure 3:
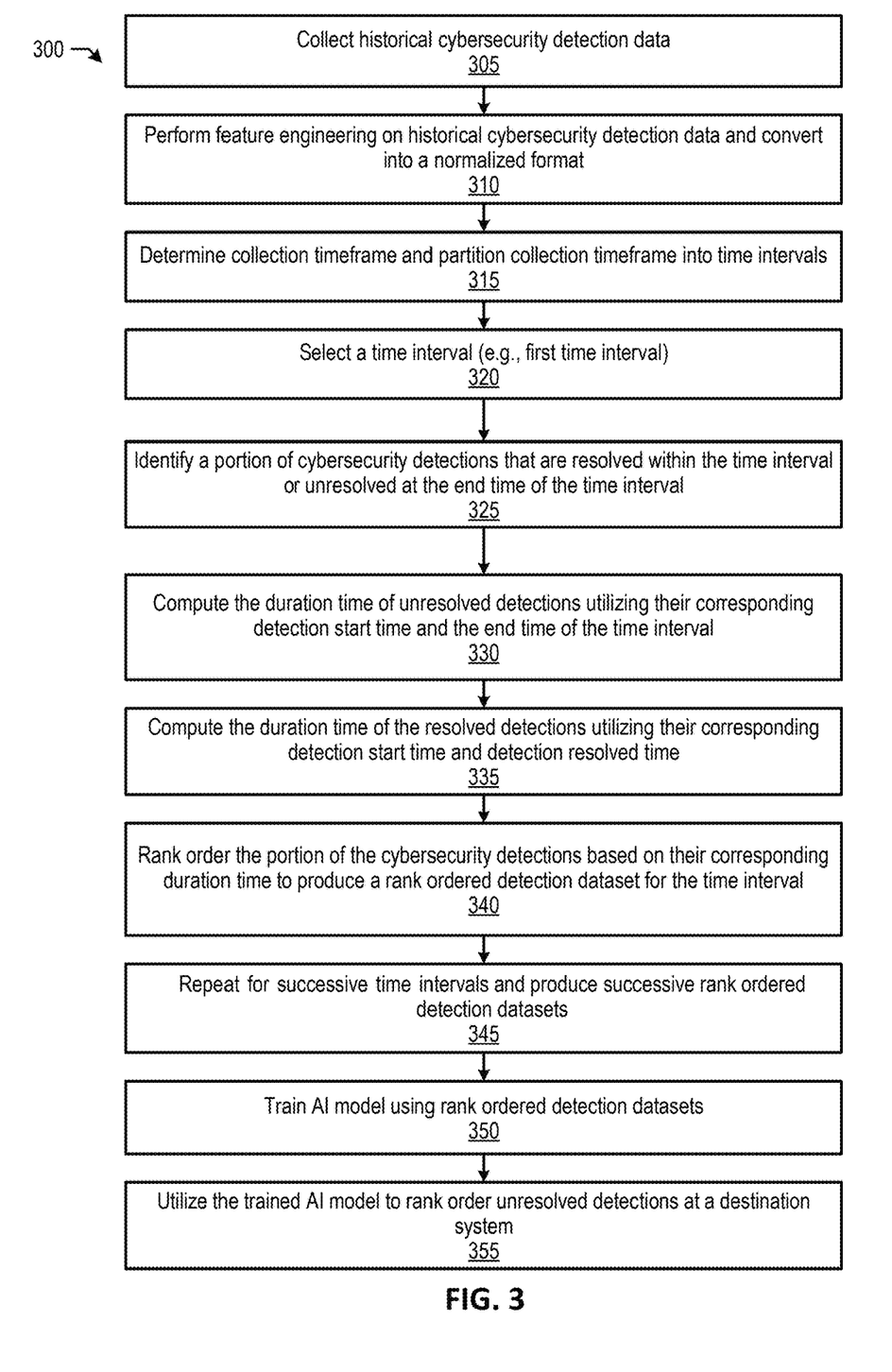
FIG. 3 is a flow diagram of a method 300 for transforming historical cybersecurity detection data into rank ordered detection datasets and training an AI model using the rank ordered detection datasets, in accordance with some embodiments.

FIG. 3 is a flow diagram of a method 300 for transforming historical cybersecurity detection data into rank ordered detection datasets and training an AI model using the rank ordered detection datasets, in accordance with some embodiments.

Method 300 may be performed by processing logic that may include hardware (e.g., a processing device), software (e.g., instructions running/executing on a processing device), firmware (e.g., microcode), or a combination thereof. In some embodiments, at least a portion of method 300 may be performed by model training pipeline 105 (shown in FIG. 1), processing device 510 (shown in FIG. 5), processing device 602 (shown in FIG. 6), or a combination thereof.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 400 may be performed.

With reference to FIG. 3, method 300 begins at block 305, whereupon processing logic collects historical cybersecurity detection data. In one embodiment, processing logic collects the historical cybersecurity detection data corresponding to destination system 145 and may collect additional historical cybersecurity detection data corresponding to systems 108.

At block 310, processing logic performs feature engineering on the historical cybersecurity detection data and converts the historical cybersecurity detection data into a normalized format. For example, processing logic may perform feature engineering to convert the historical cybersecurity detection data into a normalized format applicable to multiple types of cybersecurity detections by capturing relevant information across various cybersecurity detection types. For instance, each cybersecurity detection type may include fields such as vendor name, detection type, and risk score. These fields are standardized to ensure consistency, such as mapping 'source IP' and 'source address' to 'IP address'. Feature extraction converts the cybersecurity detections from various security vendors into a normalized set of features and may include time-based features, such as the number of similar detections in the past day or week at the organization. In one embodiment, the historical cybersecurity detection data collected from the "target" organization will be given higher weightage than historical cybersecurity detection data from other organizations to ensure that the AI model is customized for the target organization.

At block 315, processing logic determines a collection timeframe of the cybersecurity detection data and segments the collection timeframe into time intervals. For example, the collection timeframe may be a one hour timeframe and processing logic segments the collection timeframe into 5 minute time intervals.

At block 320, processing logic selects a time interval and, at block 325, processing logic identifies a portion of the cybersecurity detections that are resolved within the time interval or unresolved at an end time of the time interval. For example, referring to FIG. 2, during time interval A, cybersecurity detections d1, d3, and d6 are unresolved at the end of the time interval and no cybersecurity detections are resolved within time interval A.

At block 330, processing logic computes the duration time of unresolved cybersecurity detections utilizing their corresponding detection start time and the end time of the time interval. For example, referring to FIG. 2 for time interval A, processing logic computes 1) the duration time of cybersecurity detection d1 as the time between the detection start time S1 and T+X; 2) the duration time of cybersecurity detection d3 as the time between the detection start time S3 and T+X; and 3) the duration time of cybersecurity detection d6 as the time between the detection start time S6 and T+X.

At block 335, if applicable, processing logic computes the duration time of resolved cybersecurity detections utilizing their corresponding detection start time and the corresponding resolved detection time. Referring to FIG. 2, time interval A does not include resolved detection times and, therefore, the first time interval does not include resolved cybersecurity detections. However, the second time interval includes a resolved detection time which is discussed below in block 345.

At block 340, processing logic rank orders the portion of the cybersecurity detections based on their corresponding duration time to produce a rank ordered detection dataset. Using the example above, processing logic rank orders detection d1, d3, and d6 based on their corresponding duration times. Referring to FIG. 2, S3 is closest to T+X compared with S1 and S6, and S1 is closer to T+X relative to S6. Therefore, the order of the duration times is d3, d1, d6 (rank ordered detection dataset 250).

At block 345, processing logic repeats blocks 320 through 340 above for successive time intervals and produce successive rank ordered detection datasets. For example, turning to time interval B, at the end of time interval B, cybersecurity detections 1, 3, 6, and 5 are unresolved cybersecurity detections, and cybersecurity detection 4 starts and is resolved during time interval B. Because cybersecurity detection 4 is resolved, cybersecurity detection 4 is ranked ordered first. Then, the remaining unresolved cybersecurity detections are rank ordered according to their duration time as discussed above. The duration time of cybersecurity detection 5 is the shortest because detection 5 is the most recent cybersecurity detection relative to time T+2X. As such, the cybersecurity detections are rank ordered [d4, d5, d3, d1, d6] (rank ordered detection dataset 255).

At block 350, once the rank ordered detection datasets are determined for each of the time intervals, processing logic trains an AI model using the rank ordered detection datasets. At block 355, processing logic utilizes the trained AI model to rank order unresolved cybersecurity detections at the destination system to guide an analyst where to focus the analyst's attention.

Figure 4:
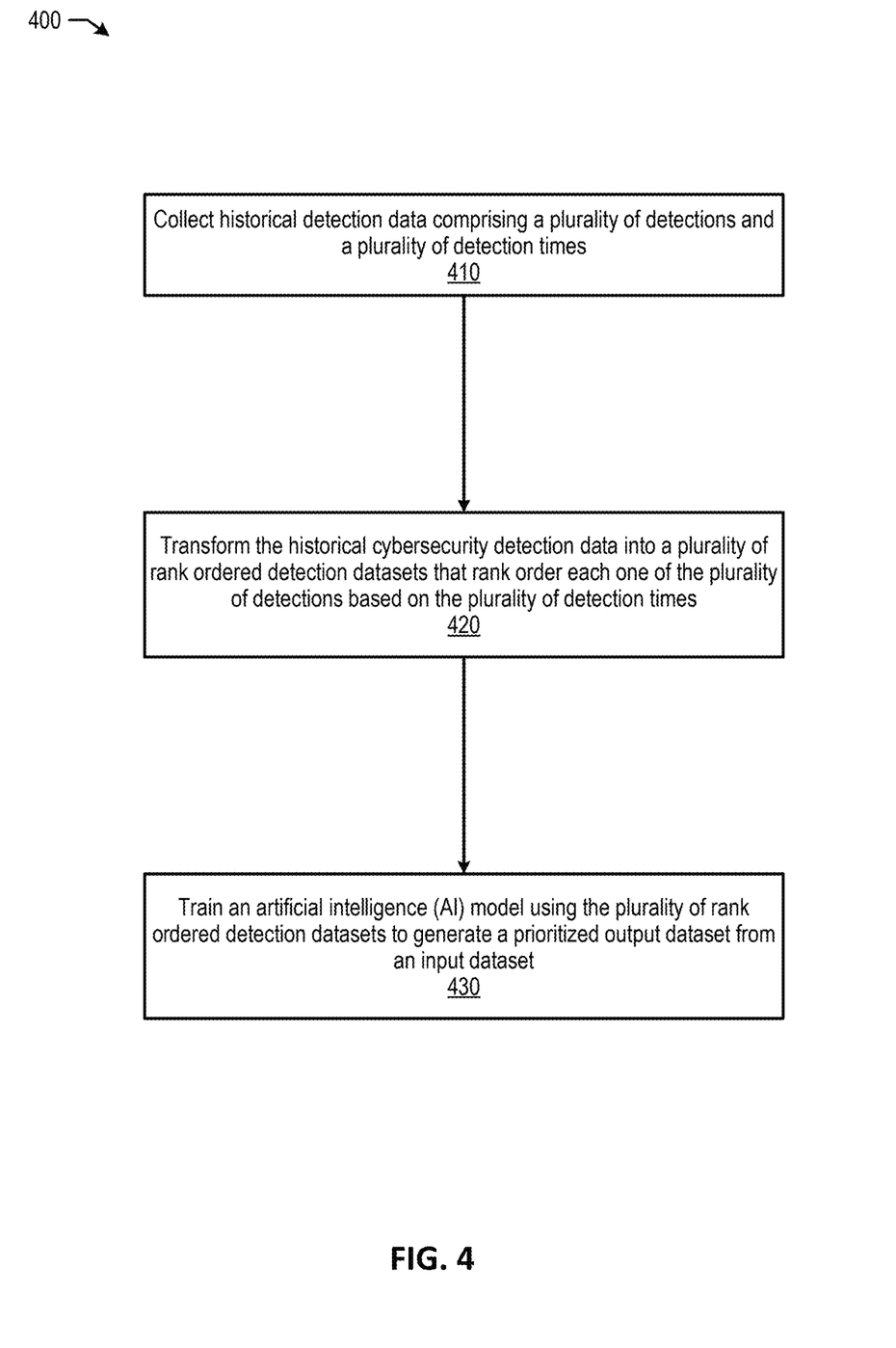
FIG. 4 is a flow diagram of a method 400 for transforming historical cybersecurity detection data into rank ordered detection datasets and training an AI model using the rank ordered detection datasets, in accordance with some embodiments of the present disclosure.

FIG. 4 is a flow diagram of a method 400 for transforming historical cybersecurity detection data into rank ordered detection datasets and training an AI model using the rank ordered detection datasets, in accordance with some embodiments of the present disclosure.

Method 400 may be performed by processing logic that may include hardware (e.g., a processing device), software (e.g., instructions running/executing on a processing device), firmware (e.g., microcode), or a combination thereof. In some embodiments, at least a portion of method 400 may be performed by model training pipeline 106 (shown in FIG. 1), processing device 510 (shown in FIG. 5), processing device 602 (shown in FIG. 6), or a combination thereof.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

With reference to FIG. 4, method 400 begins at block 410, whereupon processing logic collects historical cybersecurity detection data that includes cybersecurity detections and detection times. In one embodiment, the cybersecurity detection data also includes resolved detection times for cybersecurity detections that have been resolved. In one embodiment, the cybersecurity detection data corresponds to a data collection timeframe.

At block 420, processing logic transforms the cybersecurity detection data into rank ordered detection datasets that rank order the cybersecurity detections based on their corresponding detection times. In one embodiment, processing logic segments the data collection timeframe into time intervals and then rank orders the cybersecurity detections for each time interval.

At block 430, processing logic trains an artificial intelligence (AI) model using the rank ordered detection datasets to generate a prioritized output dataset from an input dataset. In one embodiment, the processing device sends the trained AI model to a destination system, and the AI model produces a prioritized cybersecurity detection list that includes unresolved cybersecurity detections at the destination system.

Figure 5:
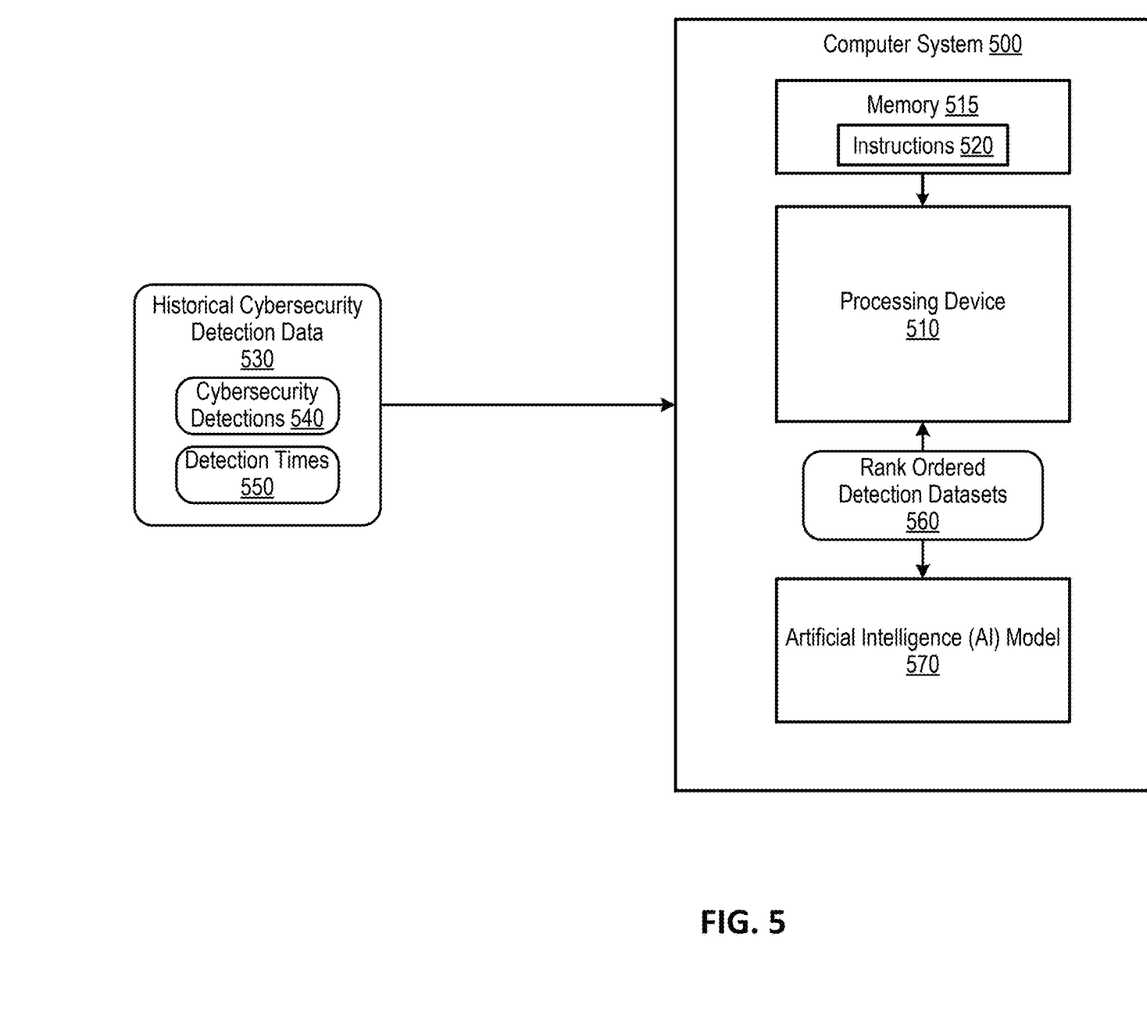
FIG. 5 is a block diagram that illustrates an example system for transforming historical cybersecurity detection data into rank ordered detection datasets and training an AI model using the rank ordered detection datasets, in accordance with some embodiments of the present disclosure.

FIG. 5 is a block diagram that illustrates an example system for transforming historical cybersecurity detection data into rank ordered detection datasets and training an AI model using the rank ordered detection datasets, in accordance with some embodiments of the present disclosure.

Computer system 500 includes processing device 510 and memory 515. Memory 515 stores instructions 520 that are executed by processing device 510. Instructions 520, when executed by processing device 510, cause processing device 510 to collect historical cybersecurity detection data 530 that includes cybersecurity detections 540 and detection times 550. In one embodiment, processing device 510 normalizes historical cybersecurity detection data 530 by mapping detection fields from one destination system to detection fields of another destination system as discussed herein.

Processing device 510 transforms historical cybersecurity detection data 530 into rank ordered detection datasets 560 that rank orders applicable cybersecurity detections 540 based on their corresponding detection times 550. In one embodiment, historical cybersecurity detection data 530 corresponds to a collection timeframe and processing device 510 segments the collection timeframe into time intervals. Then, for each time interval, processing device 510 identifies a portion of the cybersecurity detections that are resolved within the time interval or are unresolved at an end time of the time interval. Processing device 510 determines a duration time of the cybersecurity detections and rank orders the portion of the detections based on their corresponding duration time to produce a rank ordered detection dataset 560.

In turn, processing device 510 trains AI model 570 using rank ordered detection datasets 560 to generate a prioritized output dataset (e.g., prioritized system data alerts) from an input dataset (e.g., new detections and current unresolved cybersecurity detections). In one embodiment, the trained AI model deploys to a destination system 145 and produces a prioritized cybersecurity detection list corresponding to unresolved cybersecurity detections at destination system 145. The prioritized detection list is then sent to an analyst system.

Figure 6:
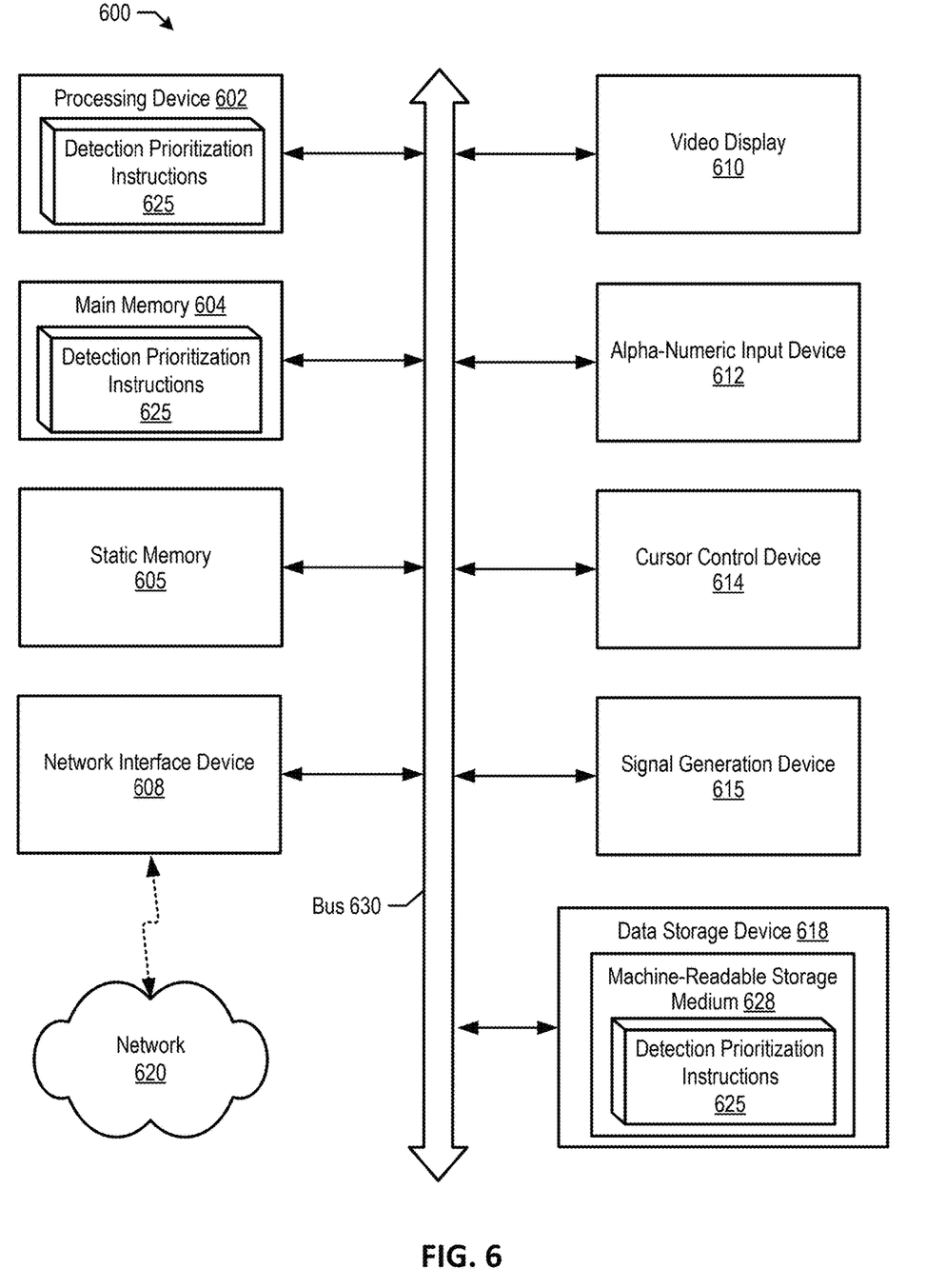
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for training an AI model to prioritize detections.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 600 may further include a network interface device 608 which may communicate with a network 620. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In some embodiments, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute detection prioritization instructions 625, for performing the operations and steps discussed herein.

The data storage device 618 may include a machine-readable storage medium 628, on which is stored one or more sets of detection prioritization instructions 625 (e.g., software) embodying any one or more of the methodologies of functions described herein. The detection prioritization instructions 625 may also reside, completely or at least partially, within the main memory 604 or within the processing device 602 during execution thereof by the computer system 600; the main memory 604 and the processing device 602 also constituting machine-readable storage media. The detection prioritization instructions 625 may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "collecting," "transforming," "training," "segmenting," "identifying," "determining," "ordering," "prioritizing," "computing," "mapping," "utilizing," "sending," "producing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112 (f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments.

However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:
 collecting historical cybersecurity detection data comprising a plurality of cybersecurity detections and a plurality of detection times;
 determining a duration time of each of the plurality of cybersecurity detections based on their respective one of the plurality of detection times;
 transforming, by a processing device, the historical cybersecurity detection data into a plurality of rank ordered detection datasets that rank order each one of the plurality of cybersecurity detections based on their respective duration time; and
 training an artificial intelligence (AI) model using the plurality of rank ordered detection datasets to generate a prioritized output dataset from an input dataset.

2. The method of claim 1, wherein the historical cybersecurity detection data corresponds to a collection timeframe, the method further comprising:
 segmenting the collection timeframe into a plurality of time intervals;
 for each one of the time intervals in the plurality of time intervals:
  identifying a portion of the plurality of cybersecurity detections that are resolved within the time interval or unresolved at an end time of the time interval; and
  determining the duration time of each one of the cybersecurity detections in the portion of the plurality of cybersecurity detections.

3. The method of claim 2, further comprising:
 rank ordering the portion of the plurality of cybersecurity detections based on their corresponding duration time to produce one of the plurality of rank ordered detection datasets.

4. The method of claim 3, further comprising:
 prioritizing, in the rank ordering, the resolved cybersecurity detections in front of the unresolved cybersecurity detections.

5. The method of claim 3, wherein the rank ordering places a cybersecurity detection with a shorter duration time in front of a detection with a longer duration time.

6. The method of claim 2, wherein the historical cybersecurity detection data comprises one or more resolved detection times corresponding to one or more of the plurality of cybersecurity detections, the method further comprising:
 computing the duration time of the portion of the plurality of cybersecurity detections that are resolved utilizing their corresponding detection time and their corresponding resolved detection time; and
 computing the duration time of the portion of the plurality of cybersecurity detections that are unresolved utilizing their corresponding detection time and the end time of the time interval.

7. The method of claim 6, wherein the one or more resolved detection times correspond to previous analyst actions to resolve their corresponding detections.

8. The method of claim 1, wherein the historical cybersecurity detection data comprises a first cybersecurity detection corresponding to a first system and a second cybersecurity detection corresponding to a second system, the method further comprising:
 mapping detection fields from the first cybersecurity detection to detection fields from the cybersecurity second detection to produce normalized cybersecurity detection data; and
 utilizing the normalized cybersecurity detection data in the transforming to produce the plurality of rank ordered detection datasets.

9. The method of claim 1, further comprising:
 sending the AI model to a destination system; and
 producing, by the trained AI model, a prioritized cybersecurity detection list that comprises unresolved cybersecurity detections at the destination system.

10. A system comprising:
 a memory; and
 a processing device, that is operatively coupled to the memory, to:
  collect historical cybersecurity detection data comprising a plurality of cybersecurity detections and a plurality of detection times;
  determine a duration time of each of the plurality of cybersecurity detections based on their respective one of the plurality of detection times;
  transform the historical cybersecurity detection data into a plurality of rank ordered detection datasets that rank order each one of the plurality of cybersecurity detections based on their respective duration time; and
  train an artificial intelligence (AI) model using the plurality of rank ordered detection datasets to generate a prioritized output dataset from an input dataset.

11. The system of claim 10, wherein the historical cybersecurity detection data corresponds to a collection timeframe, and wherein the processing device is further to:
 segment the collection timeframe into a plurality of time intervals;
 for each one of the time intervals in the plurality of time intervals:
  identify a portion of the plurality of cybersecurity detections that are resolved within the time interval or unresolved at an end time of the time interval; and
  determine the duration time of each one of the cybersecurity detections in the portion of the plurality of cybersecurity detections.

12. The system of claim 11, wherein the processing device is further to:
 rank order the portion of the plurality of cybersecurity detections based on their corresponding duration time to produce one of the plurality of rank ordered detection datasets.

13. The system of claim 12, wherein the processing device is further to:
 prioritize, in the rank ordering, the resolved cybersecurity detections in front of the unresolved cybersecurity detections.

14. The system of claim 12, wherein the rank ordering places a cybersecurity detection with a shorter duration time in front of a detection with a longer duration time.

15. The system of claim 11, wherein the historical cybersecurity detection data comprises one or more resolved detection times corresponding to one or more of the plurality of cybersecurity detections, and wherein the processing device is further to:

compute the duration time of the portion of the plurality of cybersecurity detections that are resolved utilizing their corresponding detection time and their corresponding resolved detection time; and     compute the duration time of the portion of the plurality of cybersecurity detections that are unresolved utilizing their corresponding detection time and the end time of the time interval.

16. The system of claim 10, wherein the historical cybersecurity detection data comprises a first cybersecurity detection corresponding to a first system and a second cybersecurity detection corresponding to a second system, and wherein the processing device is further to:

map detection fields from the first cybersecurity detection to detection fields from the cybersecurity second detection to produce normalized cybersecurity detection data; and     utilize the normalized cybersecurity detection data in the transforming to produce the plurality of rank ordered detection datasets.

17. The system of claim 10, wherein the processing device is further to:

send the trained AI model to a destination system; and produce, by the trained AI model, a prioritized cybersecurity detection list that comprises unresolved cybersecurity detections at the destination system.

18. A non-transitory computer readable medium, storing instructions that, when executed by a processing device, cause the processing device to:

collect historical cybersecurity detection data comprising a plurality of cybersecurity detections and a plurality of detection times;

determine a duration time of each of the plurality of cybersecurity detections based on their respective one of the plurality of detection times     transform, by the processing device, the historical cybersecurity detection data into a plurality of rank ordered detection datasets that rank order each one of the plurality of cybersecurity detections based on their respective duration time; and     train an artificial intelligence (AI) model using the plurality of rank ordered detection datasets to generate a prioritized output dataset from an input dataset.

19. The non-transitory computer readable medium of claim 18, wherein the historical cybersecurity detection data corresponds to a collection timeframe, and wherein the processing device is to:

segment the collection timeframe into a plurality of time intervals;

for each one of the time intervals in the plurality of time intervals:

identify a portion of the plurality of cybersecurity detections that are resolved within the time interval or unresolved at an end time of the time interval;

determine the duration time of each one of the cybersecurity detections in the portion of the plurality of cybersecurity detections; and     rank order the portion of the plurality of cybersecurity detections based on their corresponding duration time to produce one of the plurality of rank ordered detection datasets.

20. The non-transitory computer readable medium of claim 19, wherein the historical cybersecurity detection data comprises one or more resolved detection times corresponding to one or more of the plurality of cybersecurity detections, and wherein the processing device is to:

compute the duration time of the portion of the plurality of cybersecurity detections that are resolved utilizing their corresponding detection time and their corresponding resolved detection time; and     compute the duration time of the portion of the plurality of cybersecurity detections that are unresolved utilizing their corresponding detection time and the end time of the time interval.

\* \* \* \* \*